United States Patent [19]
Schouten

[11] 3,723,984
[45] Mar. 27, 1973

[54] STORAGE DEVICE FOR THE STORAGE OF WORD-ORGANIZED INFORMATION

[75] Inventor: Gerrit Hilbertus Schouten, Hilversum, Netherlands

[73] Assignee: U.S. Philips Corporation, New York, N.Y.

[22] Filed: July 20, 1971

[21] Appl. No.: 164,276

[30] Foreign Application Priority Data

July 22, 1970 Netherlands ........................7010815

[52] U.S. Cl. .340/174 RC, 340/174 AC, 340/174 M, 340/174 NC, 340/174 WA, 340/174 VB

[51] Int. Cl. ...............................................G11c 5/08

[58] Field of Search .................340/174 WA, 174 RC

[56] References Cited

UNITED STATES PATENTS 3,641,519 2/1972 Asaley............................340/174 RC

*Primary Examiner*—James W. Moffitt
*Attorney*—Frank R. Trifari

[57] ABSTRACT

A storage device for the storage of word-organized information, comprising magnetic storage elements which are arranged in a plurality of planes in rows and columns in an identical manner, each of said magnetic storage elements being coupled to a first drive winding which is provided per row, to a second drive winding which is provided per column, and to an inhibit and a sense windings which are provided per plane. Each sense winding is provided with a read amplifier connected thereto. Each of these read amplifiers is provided with a control terminal to which a sense generator is connected for sampling the signals which are induced in the sense windings. Furthermore, an additional surface is provided comprising magnetic storage elements which are arranged in rows and columns in an identical manner as in said planes and which are individually associated with word locations. The storage elements of the additional plane are coupled to a first drive winding which is provided per row and to a second drive winding which is provided per column in order to set the storage elements to one particular remanence state in the case of writing and to set them to the other remanence state in the case of reading of words in the corresponding word locations. For reading the information the storage elements of the additional plane are coupled to a sense winding which is connected to the sense generator in order to apply starting pulses thereto.

1 Claim, 10 Drawing Figures

Patented March 27, 1973 3,723,984

6 Sheets-Sheet 1

Figure 1:
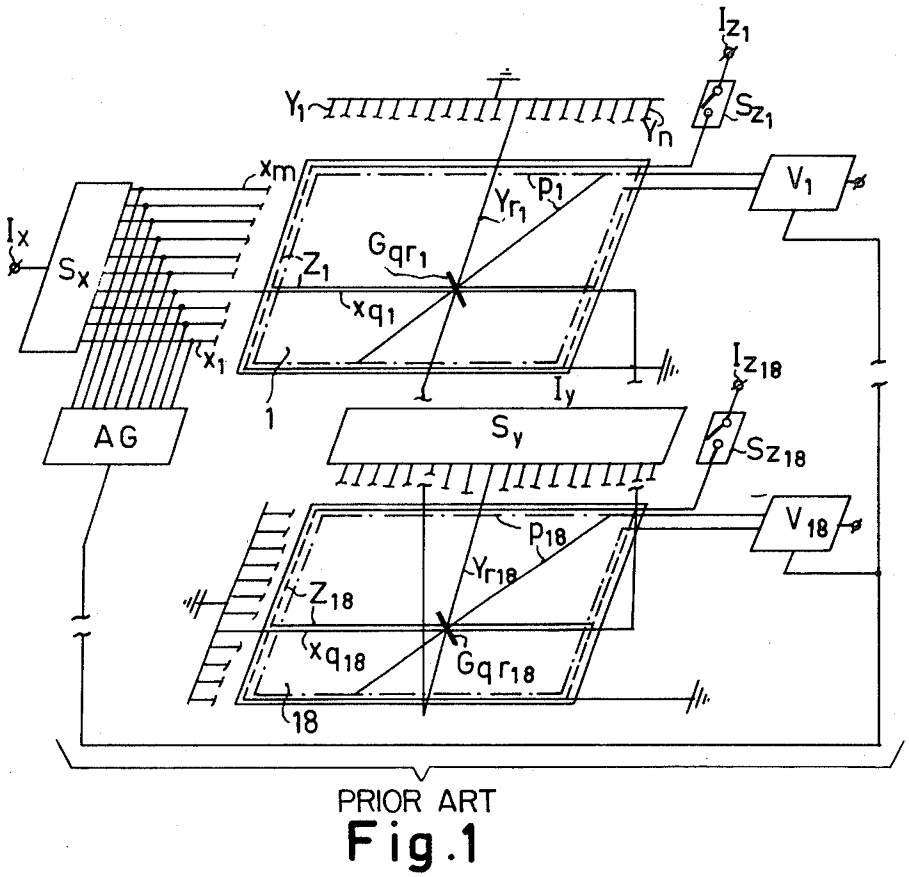
PRIOR ART Fig.1

INVENTOR.
GERRIT H. SCHOUTEN

BY [signature]
AGENT

INVENTOR.
GERRIT H. SCHOUTEN

BY Frank R. Trifari
AGENT

Patented March 27, 1973 3,723,984

6 Sheets-Sheet 3

INVENTOR.
GERRIT H. SCHOUTEN

BY

AGENT

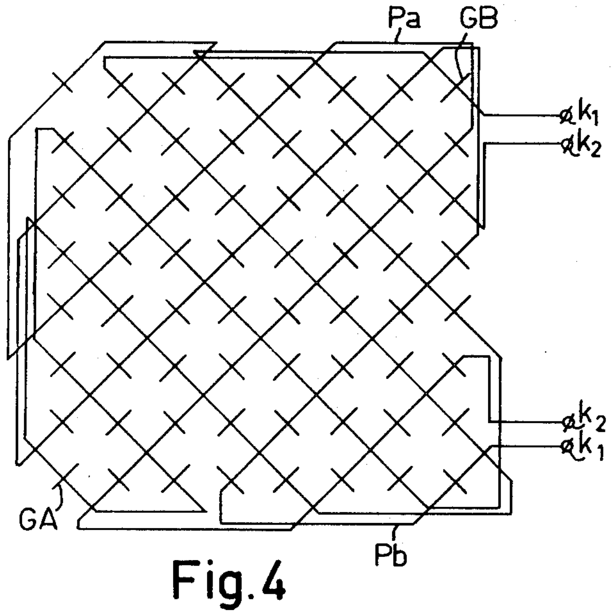
Fig.4
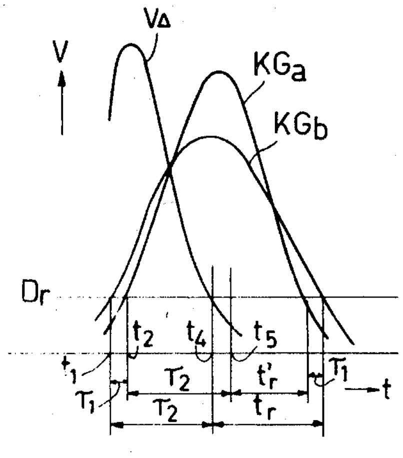
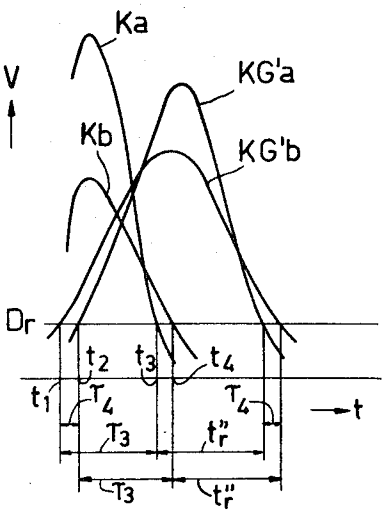
Fig.5 Fig.7
INVENTOR.
GERRIT H. SCHOUTEN
BY [signature]
AGENT

INVENTOR.
GERRIT H. SCHOUTEN

BY [signature]

AGENT

INVENTOR.
GERRIT H. SCHOUTEN

BY Frank R. Trifari
AGENT

STORAGE DEVICE FOR THE STORAGE OF WORD-ORGANIZED INFORMATION

The invention relates to a storage device for the storage of word-organized information, comprising magnetic storage elements which are arranged in an identical manner in rows and columns in a plurality of planes, each element being coupled to a first drive winding which is provided per row, to a second driving winding which is provided per column and to an inhibit and a sense winding which are provided per plane, each sense winding being provided with a read amplifier connected thereto, each of said amplifiers comprising a control terminal to which a sense generator is connected for sampling the signals induced in the sense windings, the generator being provided with an input terminal for starting.

Storage devices of this kind can be applied *inter alia* in computer and telegraphy devices. The signals induced in the sense windings by the storage elements when information is read from the storage device not only consist of desired signals but also of undesired signals. The desired signals originate from selected storage elements the magnetization state of which reverses its direction. The undesired signals originate from storage elements in which a small variation of the magnetization state occurs. These undesired signals are termed delta-noise signals. As only few spins of the total number present in a storage element are changed in the case of a small variation of the magnetization, the time in which this is effected is shorter than the time which is required for reversing all spins in a storage element. Consequently, the delta-noise leads the desired signals in time. As a result, it is possible to separate both signals by sampling the signals induced in the sense wire.

For this purpose, in a known device the sense generator is provided with a plurality of input terminals which are connected to the first device windings. The read-current pulse flowing in one of the first drive windings, when information is read from the storage device will not only drive the storage elements coupled to this winding but will also start the sense generator. After a given fixed delay time this generator supplies a sampling pulse to the control terminals of the read amplifiers. The read amplifiers, which are normally blocked, will detect the signals present on their input terminals during the occurrence of the sampling pulse. The fixed delay time of the sense generator, determining the instant at which the sampling pulse is supplied and called sensing instant, is to be chosen such that the delta-noise still lies just within this delay time. The duration of the sampling pulse is to be chosen such that the entire desired signal is situated within the sampling pulse, but that the interference voltages produced in the sense windings by the trailing edge of the half read-current pulse in the drive windings are situated outside the sampling pulse. In storage devices comprising many storage elements per plane, the number and the length of the drive and inhibit windings coupled to the storage elements are large. This implies that the value of the parasitic capacitances arising between the windings of a plane and against earth are large. Series connection of corresponding drive windings situated in different planes in word-organized stores causes voltage differences between these windings. The parasitic capacitances present between the windings of different planes are then charged. The current pulses supplied by the current sources upon selection of a storage element start, on the one hand, the sense generator directly and, on the other hand, first charge the parasitic capacitances, which is accompanied by a long charging time. It is only after this charging time that the currents in the windings at the area of the selected storage element are sufficiently large to reverse a magnetization state of the storage element which does not correspond to the current direction. The resultant signals induced in the sense windings are shifted with respect to the starting instant of the sense generator *inter alia* over this charging time. The delay time of the sense generator, therefore is to be increased with this charging time in order to supply the sampling pulse at the correct sensing instant. After the write-current pulse supplied by the current source has terminated, the parasitic capacitances will be discharged. This discharging time is large. If information is read before the parasitic capacitances have been discharged, the read-current pulse first discharges these capacitances before the capacitances are charged in the opposite direction. This additional charging time depends on the time between the read-current pulse and the preceding write-current pulse. The differences in the impedances of the windings caused by production tolerances also cause the charging times of the parasitic capacitances to be different. In order to enable information to be read without delta-noise, the read-current pulse, on the one hand, is not to be supplied within the discharge time of the parasitic capacitances after the write-current pulse. As a result, the storage device may be operated only at a limited speed. On the other hand, the delay time of the sense generator is to be selected so large that the largest charging and discharging times occurring are taken into account. This measure, however, limits the useful portion of the desired signal which is detected.

The invention has for its object to provide a quick-acting storage device of the kind set forth for the interference-free sampling of the output signals in a more reliable manner.

The device according to the invention is characterized in that an additional plane is provided, comprising magnetic storage elements which are arranged in rows and columns in an identical manner as in said planes and which are individually associated with the word locations, said storage elements being coupled to a first drive winding which is provided per row and to a second drive winding which is provided per column for setting the storage elements to one particular remanence state in the case of writing and to the other remanence state in the case of reading of words in the corresponding word locations, the storage elements being coupled to a sense winding for reading this information, said sense winding being connected to the input terminal of the sense generator in order to apply starting pulses thereto.

In order that the invention may be readily carried into effect, some embodiments thereof will now be described in detail, by way of example, with reference to the accompanying diagrammatic drawings, in which corresponding parts are denoted by the same reference characters, and in which:

FIG. 1 shows a known word-organized three-dimensional storage device.

Figure 2A:
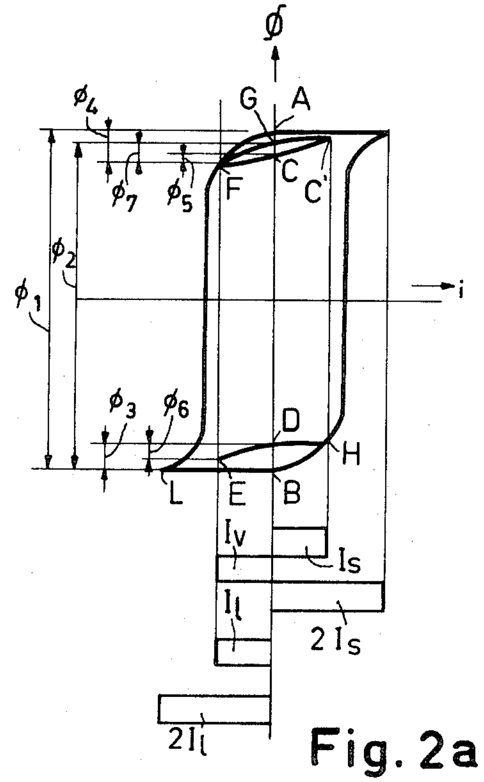
Figure 2B:
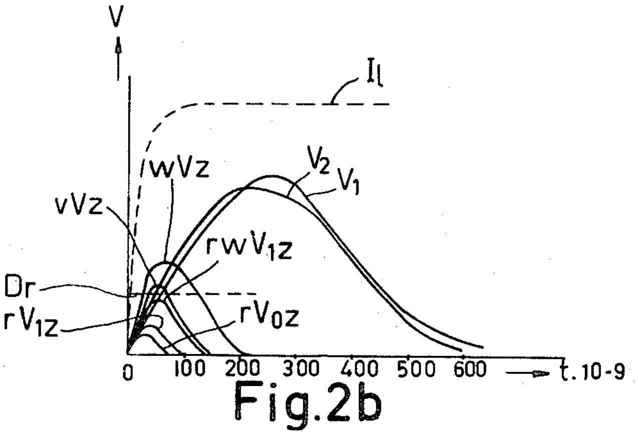
Figure 3:
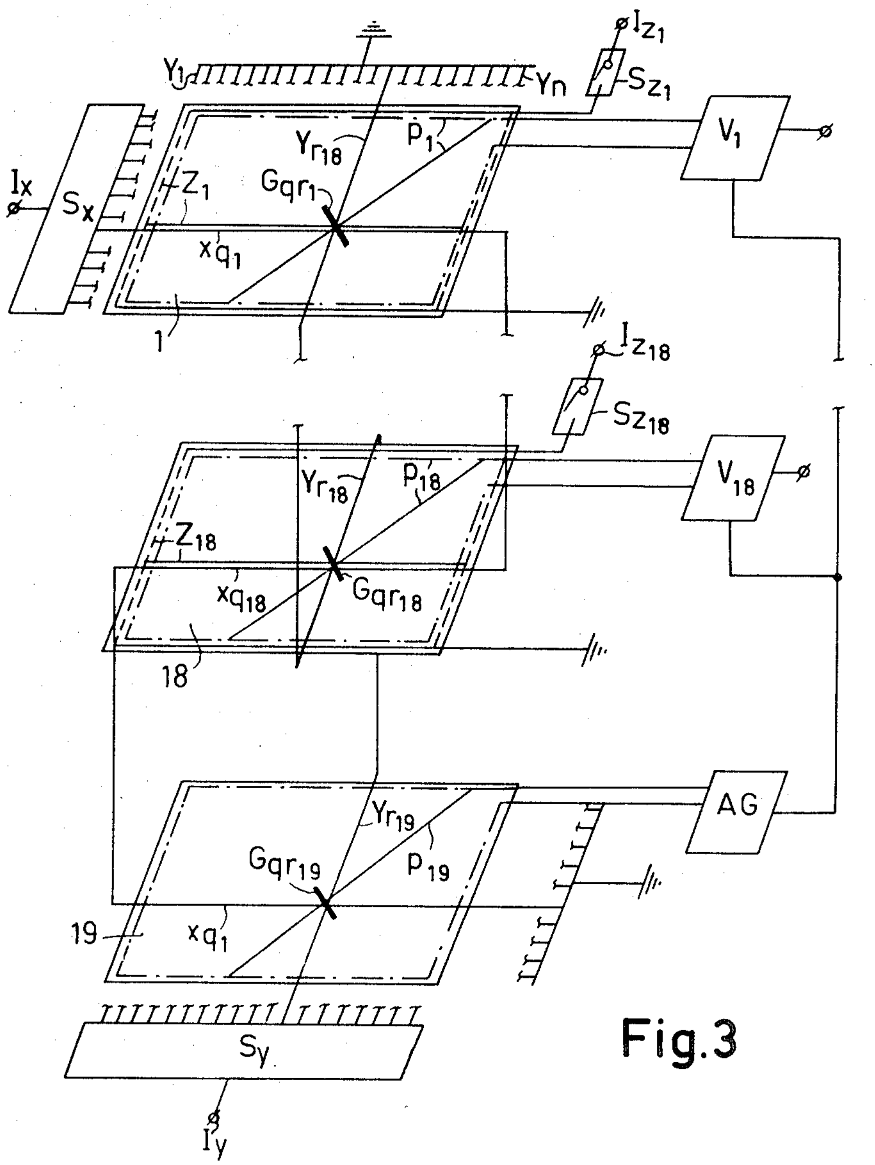
Figure 6A:
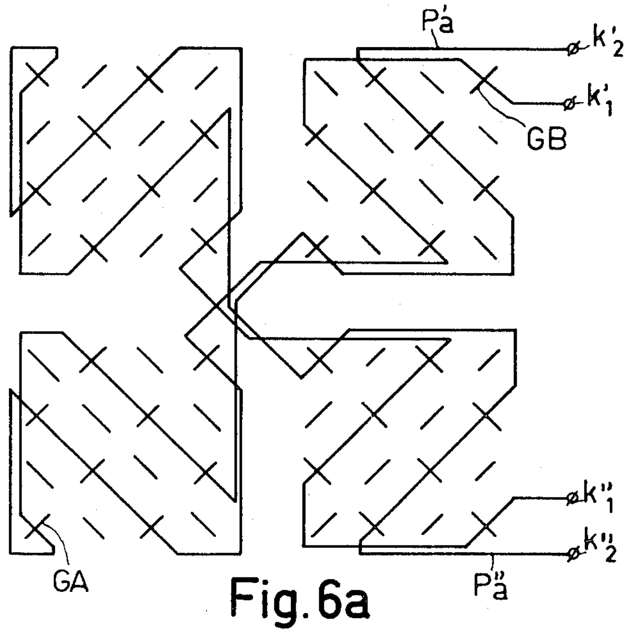
Figure 6B:
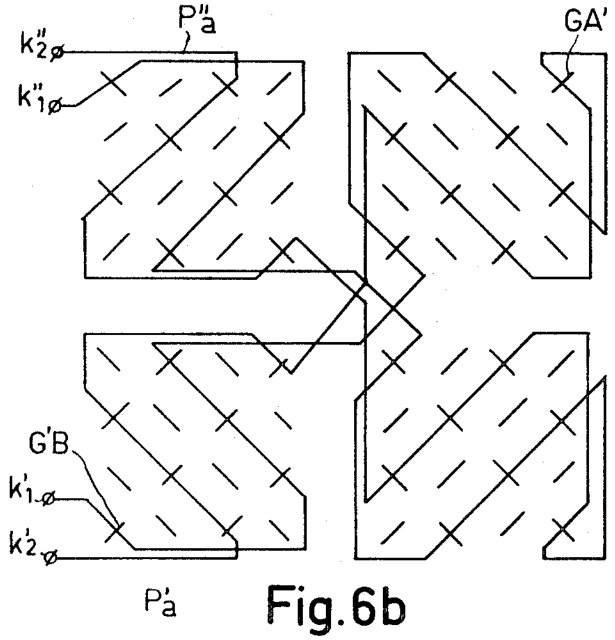
Figure 8:
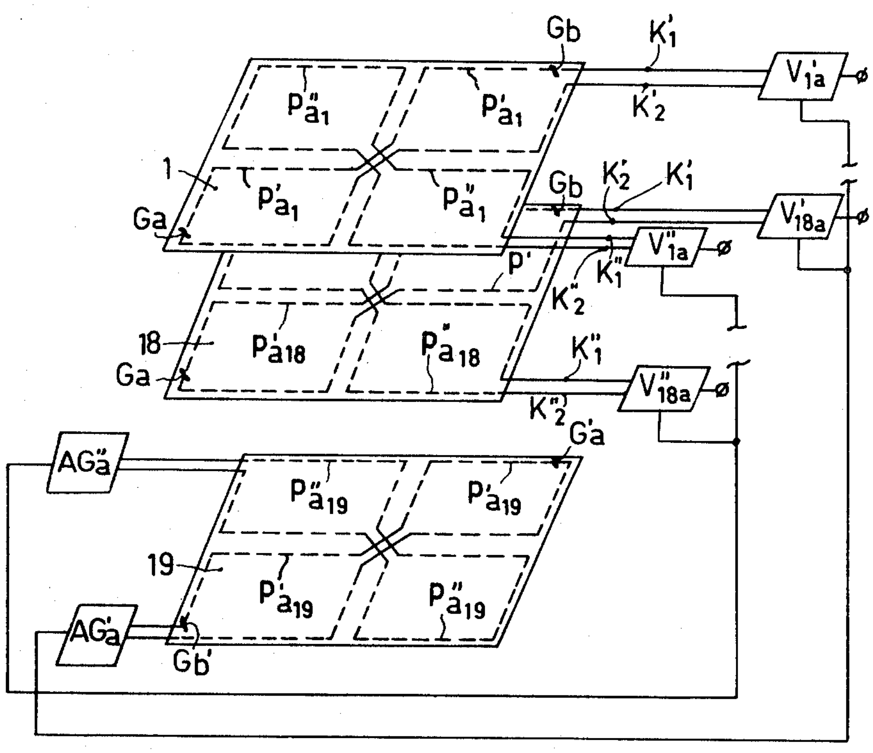

FIG. 2*a* shows the graph of an hysteresis loop,

FIG. 2*b* shows a graph of the voltages occurring in the sense windings to which a storage element is coupled, FIG. 3 shows an embodiment of a storage device according to the invention, FIG. 4 shows the way in which the sense windings are coupled to the storage elements in a plane, FIG. 5 shows a graph of the voltages occurring in the sense windings of a storage device according to the invention, FIGS. 6*a* and 6*b* show a different way of coupling the sense windings in a plane to the storage elements, FIG. 7 shows a graph of the voltages occurring in the sense winding of a storage device, the sense windings of which are provided as shown in the FIGS. 6*a* and 6*b*, FIG. 8 shows an embodiment of a storage device, the sense windings of which are provided as shown in the FIGS. 6*a* and 6*b*.

The word-organized storage device according to the known state of the art shown in FIG. 1 in this example comprises 18 planes having storage elements arranged in *m* rows and *n* columns per plane. Of these elements only the elements $G_{q,r,1}$ and $G_{q,r,18}$ are shown. For writing information in the storage elements each of these elements is provided with a first drive winding $x_e$ ($e = 1,2 \ldots .m$) which is provided per row, with a second drive winding $y_f$($f = 1, 2, 3 \ldots .n$) which is provided per column and with an inhibit winding *z* which is provided per plane. For reading information from these elements, a sense winding *p* and a read amplifier V connected thereto are provided per plane. In order to obtain a word-organized storage device, the corresponding first drive windings *x* of the various planes are connected in series, the corresponding second drive windings *y* of the various planes are connected in series and a switching contact $s_z$ is provided per plane. For selecting storage elements per word location selection switches $S_x$ are provided for connecting one of the series connections of the first drive windings, *via* connection terminal $I_x$, to a current source not shown, and a selection switches $S_y$ are provided for connecting one of the series connections of the second drive windings to a current source not shown, *via* connection terminal $I_y$. The switches $S_{z1}$ to $S_{z18}$ are closed or are not closed, in accordance with the information to be written in the word locations, for connecting the inhibit windings $z_1$ to $z_{18}$ to the connection terminals $I_{z1}$ to $I_{z18}$ of current sources not shown.

The most important flux variations occurring when information is written in or read from the storage device will be described with reference to the hysteresis loop shown in FIG. 2*a*. It is assumed that if the storage element has the remanence state represented by point A, an information is stored which is denoted by the symbol "1," and that if the storage element has the remanence state represented by point B, an information is stored which is denoted by the symbol "0." For writing a "1" into a storage element containing a "0," a half write current $I_s$ is passed through each of the drive windings coupled to this element due to the closing of a switching contact of selection switch $S_x$ and a switching contact of selection switch $S_y$. This half write current has half the value required for bringing the remanence state of the storage element from state B to state A. The sum current $2I_s$ to which this element is coupled will set the storage element to the state "1." During writing the storage elements coupled to one of the drive windings of the selected element and having the remanence state B will change their remanence state *via* state H to state D under the influence of the half write current $I_s$ in that drive winding due to the fact that the hysteresis loop is not rectangular. This remanence state is called "disturbed 0." If a "0" is to be written in the selected element, an inhibit current $I_v$ is passed through the inhibit winding, said inhibit current being inversely equal to the half write current in the drive windings. The selected core is then coupled to the half write current $I_s$ so that this element is also set to the "disturbed 0," state. The storage elements which are then coupled only to the inhibit winding and which are in the "1" state change their remanence state from A *via* F to C under the influence of the inhibit current, the latter remanence state being capped "disturbed 1." The half-selected storage elements which are in the "1" state will also change their remanence state from A *via* F to C during reading. As the storage device is designed such that, after information has been read, information is first written in the read storage element before information is read again, the half-selected storage elements in the state C will change their remanence state from C *via* C' to G.

Therefore, the storage element cannot only be in the desired remanence states A and B but also in the remanence states C, D and G, Hereinafter the fluxes inducing interference voltages in the sense windings when information is read are described. Attention will be paid only to those interference voltages which occur as a result of the leading edge of a read-current pulse. These interference voltages are illustrated in FIG. 2*b*. A selected storage element which is in the remanence state D will change the remanence state from D to L upon reading, and will cause a flux variation $Q_3$ which induces a voltage variation $wV_Z$. A storage element which is coupled to a half read current $I_1$ and which is in the "undisturbed 1" state, will change the remanence state from A to F, and will cause a flux variation $Q_4$ which induces a voltage $vV_Z$ in the sense windings. If the element is in the "disturbed 1" state, the remanence state changes from C to F, which causes a flux variation $Q_5$ which induces a voltage $rV_{1z}$ and, if the element is in the "disturbed 0" state, the remanence state changes from D to E, which causes a flux variation $Q_6$ which induces a voltage $rV_{oz}$ in the sense winding. A storage element which is in the remanence state G and which is coupled to a half read current changes the remanence state from G to F, thus causing a flux variation $Q_7$ which induces a voltage $rwV_{1z}$ in the sense winding.

A selected storage element which is in the "1" state or in the "disturbed 1" state, changes the remanence state from A to B, and from C to B, respectively, thus causing a flux variation of $Q_1$ and $Q_2$, respectively, which induces a voltage $V_1$ and $V_2$, respectively, in the sense winding. The latter voltages are the desired signals.

The sum of all interference voltages induced in the sense windings when a storage element is read by the half-selected storage elements and the selected storage element which is possibly in the "disturbed 0" state, is called delta noise. This delta-noise may have a higher amplitude than the desired signal. In order to reduce the effect of the delta-noise, it is known to couple half the number of storage elements in a plane to the sense winding in a positive sense and to couple the other half to the sense winding in a negative sense. In the case of large storage devices, and in the case of special pattern of information written into the storage elements, this compensation, however, is insufficient.

As appears from FIG. 2*b*, the delta-noise leads the desired signal in time. In order to enable the desired signals to be taken off without interference, a sense generator AG is incorporated in the known storage device shown in FIG. 1. This generator AG has a number of input terminals which are connected to the first drive windings. Each of the read amplifiers $V_1$ to $V_{18}$ is provided with a control terminal which is connected to the output terminal of the sense generator AG. This sense generator AG applies, so long as no input signal is supplied, a voltage to the control terminals of the voltage amplifiers $V_1$ to $V_{18}$ such that these amplifiers are blocked. If, during selection of a core, the half write current $I_s$ is passed through one of the first drive windings, it is also applied to one of the input terminals of the sense generator AG. This generator AG is designed such that a sampling pulse is supplied a given delay after reception of an input signal. The read amplifiers $V_1$ to $V_{18}$ are opened by the sampling pulse for the duration of the latter, and during this time the amplifiers detect the signals inducted in the sense windings $p_1$ to $p_{18}$. For sensing a useful portion of the desired signal which is as large as possible, the given delay time and the duration of the sampling pulse are to be selected so that an interference-free portion as large as possible of the desired signal is situated within the sampling pulse. The sensing instant, determined by the leading edge of the sampling pulse, is therefore to occur immediately after the delta-noise signals in the sense windings $p_1$ to $p_{18}$ have decreased to a value such that they no longer interfere. The duration of the sampling pulse is to be such that the signals are induced in the sense windings $p_1$ to $p_{18}$ by the trailing edge of the half read-current pulse after the pulse duration of the sampling pulse.

Deriving a sampling pulse from a current pulse occurring in one of the first drive windings $x_1$ to $x_m$ is not very suitable for large and fast storage devices. These storage devices, comprising many storage elements per plane, have many and long drive and inhibit windings. Consequently, these windings have large parasitic capacitances both mutually and with respect to earth. Owing to the inductive character of the impedances of the inhibit and the sense windings, the amplitude of the output voltage of the current source during the leading edge of the current pulse will be two to three times larger than the amplitude of the voltage occurring during the crest of the current pulse. During the writing and reading of information, which is alternately effected in these storage devices, the parasitic capacitances are charged to said high voltage by the half write current and half read current, respectively. Due to the series connection of corresponding drive windings situated in the various planes, for example, $x_{q1}$ to $x_{q18}$, voltage differences arise also between these windings of the various planes. These voltage differences will charge the parasitic capacitances occurring between these windings. This is accompanied by a long charging time. The charging time of a storage device used in practice, having storage elements arranged in 128 rows and in 128 columns per plane and comprising 18 planes, is approximately 200 ns. The time during which delta-noise is induced by the storage elements in the sense wires after the amplitude of the read or write current pulse, respectively, has reached a constant value after switching on , i.e., after the parasitic capacitances have been charged, amounts to approximately 150 ns according to the graphs shown in FIG. 2*b*. The total delay time of the sense generator is approximately equal to the sum of these times. This amounts to approximately 350 ns.

After the parasitic capacitances have been charged to the voltage of the voltage pulse generated by the leading edge of the current pulse, these capacitances will tend to discharge. In order to select these windings diodes are incorporated in series with the drive windings. The diodes of the non-driven windings are blocked during discharging of the parasitic capacitances so that the discharge time is very large. The discharge time is known to be reduced by using leakage resistors. The value of the latter cannot be chosen too small in view of the fact that the voltage of the parasitic capacitances is not to decrease below the voltage occurring during the crest of the current pulse as otherwise the current source compensates for the discharge current, thus causing additional dissipation. The discharge time of the parasitic capacitances, therefore, always still amounts to one-and-a-half to two times the time of the duration of the read or write-current pulse, respectively. The direction in which the half write-current pulse passes through the drive windings is opposed to the direction of the read-current pulse. Consequently, the parasitic capacitances are charged in another direction during writing than during reading. As the discharge time is large, the charge of the parasitic capacitances will not yet have been depleted when information is read immediately after writing. This residual charge is first to be depleted by the half read-current pulse. This requires an additional charging time. The delay time of the sense generator AG is fixed, while the additional charging time depends on the time between writing and subsequent reading of information from the storage device, said time being arbitrary. The wiring impedances across which the parasitic capacitances are charged also determine the charging times. These wiring impedances are slightly different for each wiring, due to production tolerances. Consequently, a spread occurs in the charging times of the parasitic capacitances of different drive windings.

In the known storage device the starting pulses for the sense generator AG are generated only by the currents in the first drive windings $x$. If the half write-current pulses in the second drive windings $y$ occur slightly later than those in the first drive windings, part of the delta-noise caused by the half write-current pulses in these windings will be situated within the time of the sampling pulse.

In order to enable information to be read without delta-noise, the half read-current pulse is not to be supplied within the discharge times of the parasitic capacitances after the half write-current pulse. The rate at which the storage device may be operated is thus limited considerably. The delay time of the sense generator AG, moreover, is to be chosen so large that the largest charging time occurring and the largest time difference liable to occur between the current pulses in the first and the second drive windings ($x$ and $y$), respectively are taken into account. These measures involve the drawback that not the entire useful portion of the desired signal is detected in the case of smaller charging times and a smaller time difference between the currents in the drive windings $x$ and $y$.

In accordance with the invention an additional plane 19 is provided, comprising, in an identical manner as said planes 1 to 18, magnetic storage elements which are arranged in rows and columns and which are individually associated with the word locations, said storage elements being coupled to a first drive winding which is provided per row and to a second drive winding which is provided per column for setting the storage elements to a given remanence state upon writing and setting them to the other remanence state upon reading of words in the corresponding word locations, the storage elements being coupled to a sense winding $p_{19}$ for reading this information, said sense winding $p_{19}$ being connected to the input terminal of the sense generator AG.

In the embodiment of a device according to the invention shown in FIG. 3, an additional plane 19 is provided in order to obtain starting pulses for the sense generator AG, said plane comprising storage elements which are arranged in rows and columns in an identical manner as in the planes 1 to 18. The first and the second drive windings of this plane are connected in series to the corresponding first and second drive windings of the other planes so that upon selection of the storage elements of a given word location in the planes 1 to 18, the storage element in plane 19 associated with this word location is also selected. The storage elements of this plane 19 are furthermore coupled to a sense winding $P_{19}$. The sense generator AG, having only one input in this case, is connected to this sense winding $p_{19}$ for applying starting pulses to the sense generator AG. The absence of an inhibit wire is the reason why during writing of a word in a word location of the storage device the storage element in the plane 19 which is associated with this word location is always set to the undisturbed "1" state, and is set to the "0" state during reading. During reading of a word, a half-selected storage element which is in the "1" state is set to the "disturbed 1" state. Prior to reading the storage elements in the additional plane are only in the undisturbed or the disturbed "1" state due to the fact that, if information has been read from a word location, information is first written in that word location before information can be read again. Like the sense windings $p_1$ to $p_{18}$, the sense winding $p_{19}$ is so arranged that half the number of storage elements is positively coupled to the sense winding while the other half is negatively coupled to the sense winding. The interference voltages supplied by the storage elements will substantially cancel each other due to the fact that the storage elements in the plane 19 are in the "1" state or disturbed "1" state during reading of information from the storage device. During reading the selected storage element of the additional plane is set to the "0" state, thus inducing a desired signal in the sense winding $p_{19}$ which is substantially free of delta-noise. This noise-free signal is applied to the sense generator AG. As soon as the amplitude of the interference-free signal exceeds a threshold value, denoted in FIG. 2b by D$r$, the sense generator AG is started. The desired signals induced in the sense windings $p_1$ to $p_{19}$ during reading of a word occur substantially simultaneously. The instant of starting of the sense generator AG by the pulse induced in the sense winding $p_{19}$ consequently, coincides with the instant of occurrence of the desired signals in the windings $p_1$ to $p_{18}$. As is shown in FIG. 2b, the delta-noise signals in the windings $p_1$ to $p_{18}$ have decreased to a negligible low level approximately 150 ns after the signal in the sense winding $p_{19}$ has exceeded the threshold value D$r$. The sense generator AG shown in FIG. 3 comprises a delay device having a delay time of approximately 150 ns. After this delay time, the sense generator supplies a sampling pulse of sufficient length to the control terminals of the read amplifiers $V_1$ to $V_{18}$ which operate in the manner set forth. As a result of said measures the portion of a desired signal which is induced in the sense winding after the delta-noise is situated entirely within the sampling pulse and is independent of charging and discharging times of the parasitic capacitances. Consequently, information may be read immediately after information has been written. The discharging of parasitic capacitances by the read-current pulse is effected many times faster than the discharging across the leakage resistors so that the storage device can be operated at a considerably higher speed as result of the provision of the additional plane.

The drawbacks arising from the differences occurring in the charging times due to production tolerances of the drive windings, are also eliminated due to the independence of the charging and discharging times from the simultaneous occurrence of the desired signals of the drive windings $p_1$ to $p_{19}$. Likewise, a possible time difference between the occurrence of the current pulses in the first and the second drive windings has no effect as the desired signals in the sense windings $p_1$ to $p_{18}$ and the desired signal in sense winding $p_{19}$ are generated by the sum current of the read currents flowing in the first and the second drive windings.

In very large storage devices the delay time of the signals induced in sense winding $p_{19}$ has a considerable effect on the instant at which the sampling pulse occurs. This will be described with reference to the wiring diagram of sense windings in a plane of the storage device shown in FIG. 4 and the graph shown in FIG. 5. For the sake of clarity, FIG. 4 shows as an example a plane comprising storage elements arranged in 8 rows and 8 columns. Sense winding $P_a$ is coupled to half the number of storage elements and sense winding $P_p$ is coupled to the other half. The sense windings $P_a$ and $P_b$ are provided in the plane in an identical manner. The delay times occurring in these windings will be described with reference to the sense winding $P_a$. The storage element GA which is coupled to the sense winding $P_a$ is situated at equal distances from the connection terminal $k_1$ and the connection terminal $k_2$, measured along this winding. The storage element GB is coupled to the sense winding $P_a$ in the vicinity of terminal $k_1$. One half of a desired voltage pulse induced in the sense winding $P_a$ by the storage element GA when information is read proceeds along the sense winding to the connection terminal $k_1$, whilst the other half proceeds to connection terminal $k_2$. The voltage pulse induced in the sense winding will be present between the terminals $k_1$ and $k_2$ after a delay time $\tau$. One half of the desired voltage pulse induced in the sense winding by the storage element GB when information is read will be present directly on connection terminal $k_1$ and the other half will be present on connection terminal $k_2$ after a delay time $2\tau$. The voltage between the connection terminals $k_1$ and $k_2$ consists of the sum of these two pulses, one of which is a time $\tau$ earlier present between the terminals $k_1$ and $k_2$ with respect to the desired voltage pulse from the storage element GA, the other pulse being present a time $\tau$ later than said pulse. The sum of the two voltage pulses from the element GB, consequently, contains more higher harmonics than the sum of the two voltage pulses from element GA. The higher harmonics are considerably damped due to the large parasitic capacitance and the impedance of the sense windings which are terminated by a transformer winding not shown between the terminals $k_1$ and $k_2$. The amplitude of the voltage pulse from the storage element GB, consequently, is lower than that of the pulse from storage element GA.

FIG. 5 shows voltages measured in a storage device used in practice and comprising 19 planes, in each of which storage elements are arranged in 128 rows and 128 columns. The sense windings $p_a$ and $p_b$ of this storage device are provided in the same manner as the sense windings, $p_a$ and $p_b$ shown in FIG. 4, and are connected in the planes 1 to 18 to read amplifiers $V_a$ and $V_b$ and are connected in plane 19 to sense generators $AG_a$ and $AG_b$. The storage elements which are coupled to the sense winding $p_a$ in the same way as the storage elements GA and GB in FIG. 4 are coupled to the sense winding Pa are denoted by G*a* and G*b*. The desired voltage measured between the output terminals $K_1$ and $K_2$ of a sense winding $p_a$ and induced by element GA is represented in FIG. 5 by the curve KG*a*. A delay time $\tau_1$ after it has been induced in sense winding $p_a$ this voltage will be present between the connection terminals $K_1$ and $K_2$. The desired voltage measured between the output terminals $K_1$ and $K_2$ and induced by storage element G*b* is represented by curve KG*b*.

The delta-noise measured between the connection terminals $K_1$ and $K_2$ of a sense winding $p_a$ when information is read depends on the magnetization state of the storage elements coupled to the drive windings of the selected storage element. These magnetization states are determined by the case history. The curve V$\Delta$ in FIG. 5 represents the delta-noise signal measured between the connection terminals $K_1$ and $K_2$ of a sense winding $p_a$. The storage elements coupled to one of the drive windings of the selected storage element contain information such that the delta noise generated by the elements individually is mutually amplified. The sense generator AG*a* has a threshold value which is represented by the line D*r* in FIG. 5. If the voltage pulse KG*b* occurs in the sense winding of the additional plane 19, it exceeds the threshold value D*r* at the instant $t_1$ and starts the sense generator AG*a*. The delta-noise signals V$\Delta$ which occur in the sense windings of the planes 1 to 18 are damped to a level which is equal to the threshold value D*r* at the instant $t_4$. The delta-noise occurring after this instant is too weak to be detected. At this instant $t_4$ the sense generator AG*a* can supply a sampling pulse to the read amplifiers $V_{1a}$ to $V_{18a}$. The corresponding delay time of the sense generator AGa is minimum and equal to $\tau 2 = t_4 - t_1$ for sensing the desired signals without delta-noise. The period after the sense instant $t_4$, during which the amplitude of the desired signal exceeds the threshold value $D_r$, is denoted by $t_r$. If the voltage pulse KGa occurs in the sense winding $p_a$ of plane 19, the sense generator AGa is started by this pulse at the instant $t_2$. The sense generator will supply the sampling pulse to the control inputs of the read amplifiers $V_{1a}$ to $V_{18a}$ at the instant $t_5$, being the delay time $\tau_2$ after the instant $t_2$. As a result, of the desired signals coming from storage elements situated in the planes 1 to 18 only the portions induced in the sense windings after the instant $t_5$ will be detected by the read amplifiers $V_{1a}$ to $V_{18a}$. In FIG. 5 the time during which the amplitude of a signal coming from a storage element Ga containing the information "1" exceeds the threshold value D*r* is denoted by *tr'*. The time *tr'* is much smaller than the time *tr*. The portions of the desired signals situated within the sampling pulse and exceeding the threshold value are greatly dependent on the location in the storage device from which this information is read.

The storage device according to the invention takes this into account as the sense windings are provided in the manner shown in FIGS. 6*a* and 6*b*.

In FIG. 6*a* the sense windings are shown of one of the planes 1 to 18 of a storage device comprising 19 planes, said plane comprising magnetic storage elements arranged, as an example, in 8 rows and 8 columns. In this plane four sense windings are provided, two of which, i.e., $P_a'$ and $P_a''$, are shown. The sense wire $p_a'$ is coupled to half the number of storage elements situated in the first and third quadrants of the plane. The sense wire $p_a''$ is connected to half the number of storage elements situated in the second and fourth quadrants. Half the number of storage elements coupled to the sense wires is positively coupled, while the other half is negatively coupled.

When information is read from storage element GA in one of the planes 1 to 18, only delta-noise from half-selected storage elements situated in the third quadrant of this plane is induced in the sense windings $p_a'$ of this plane. One half of this delta-noise will flow, *via* one side of the sense winding $P_a'$, to output terminal $k_1'$, while the other half will flow to output terminal $k_2'$ *via* the other side of sense winding $P_a'$. The delay time of these signals in the sense winding amounts to approximately a time $\tau$ so that the delta-noise voltage will be present between the connection terminals $k_1'$ and $k_2'$ approximately this time $\tau$ after it has been induced in the winding $P_a'$.

When information is read from storage element GB, only delta-noise signals from half-selected storage elements situated, like element GB, in the first quadrant will be induced in the sense windings $P_a'$.

One half of this delta-noise signal will be present on terminal $k_1'$ immediately after it has been induced in the sense winding $P_a'$. The other half of this signal will flow to terminal $K_2'$ *via* the portion of the sense winding $P_a'$ which is situated in the third quadrant of the plane, and will be present on this terminal $k_2'$ a time $2\tau$ after it has been induced in the sense winding $p_a'$. In FIG. 7 voltages are shown which have been measured on a storage device which is used in practice and which comprises 19 planes, in each of which storage elements are provided which are arranged in 128 rows and 128 columns. The sense winding $p_a'$ is provided in the same way as the sense winding $P_a'$ shown in FIG. 6a. The storage elements which are coupled to the sense winding $p_a'$ in the same way as the storage elements GA and GB shown in FIG. 6a are coupled to the sense winding $P_a'$, are denoted by Ga and Gb. The delta-noise measured between the connection terminals $K_1'$ and $K_2'$ of sense winding $p_a'$, occurring when element Ga is selected, is represented in FIG. 7 by curve Ka. A delay $\tau_4$ after it has been induced in the sense winding, this voltage is present between said connection terminals. In the same way, the delta-noise measured between the connection terminals $K_1$ and $K_2$ and occurring upon selection of storage element Gb is represented by curve Kb. The information then stored in the storage elements is selected such that all delta-noise signals induced in the sense wire $P_a'$ amplify each other.

As is shown in FIG. 7, delta-noise occurring upon selection of storage elements which are simultaneously selected with storage element Ga, has already decreased below the threshold value Dr of the sense generator AG at the instant $t_3$. Upon selection of storage elements which are simultaneously selected with storage element Gb, the delta-noise has decreased below the threshold value Dr at the latter instant $t_4$.

The time expiring between the instant $t_3$, shown in FIG. 7, and the instant $t_5$, shown in FIG. 5, can be utilized as an additional detection time of desired signals induced in the sense windings and originating from storage elements which are simultaneously selected with storage element Ga. For this purpose, the sense windings $P_a'$ and $P_a''$, of the additional plane 19, shown in FIG. 6b, extend through the storage elements in the opposite direction with respect to the sense windings of the other planes 1 to 18, one of which is shown in FIG. 6a. The advantages of providing the windings $P_a'$ and $P_a''$ in the additional plane 19 in this way will be described with reference to a storage device which is used in practice and which is shown in FIG. 8, and also with reference to the graphs of FIG. 7.

FIG. 8 shows a simplified diagram of the storage device according to the invention. The sense windings in the planes 1 to 19 are provided in the planes such that half the number of storage elements situated in the first and third quadrants of the planes are coupled to the sense windings $p_a'$, half the number of storage elements situated in the second and fourth quadrants of the planes being coupled to the sense windings $p_a''$. Connected to the output terminals $K_1'$ and $K_2'$ of the sense windings $p_a'$ of the planes 1 to 18 are first read amplifiers $V_{1a}'$ to $V_{18a}'$. Connected to the output terminals $K_1''$ and $K_2''$ of the sense windings $p_a''$ of the planes 1 to 18 are second read amplifiers $V_{1a}''$ to $V_{18a}''$. The sense windings $p_{19a}'$ and $p_{19a}''$ extend through the storage elements in the direction opposite to that of the sense windings situated in the other planes and are connected to the input terminals of sense generators $AG_a'$ and $AG_a''$ respectively. The output terminal of sense generator $AG_a'$ is connected to the control terminals of the amplifiers $V_{1a}'$ to $V_{18a}'$, and the output terminal of sense generator $AG_a''$ is connected to the control terminals of the amplifiers $V_{1a}''$ to $V_{18a}''$. The shape of the voltage signal which is applied to the connection terminals of the sense generator $AG_a'$ upon selection of the storage element Ga' of the additional plane 19 is represented in FIG. 7 by curve KGa'. The signal which is applied to sense generator $AG_a'$ upon selection of the storage element Gb' of the additional plane 19 is represented in FIG. 7 by curve KGb'.

The operation of the storage device according to FIG. 8 is as follows. When information is read from storage elements Ga in the planes 1 to 18, the element Gb' in plane 19 is simultaneously read and the sense generator $AG_a'$ is started by the signal KGb' induced in the sense winding $p_{19}'$ by element Gb' at the instant $t_1$ (see FIG. 7). The delta-noise produced by this selection in the sense windings $p_a'$ of the planes 1 to 18 has decreased below the threshold value Dr at the instant $t_3$. The fixed delay time of the sense generator $AG_a'$, consequently, only has to have the value $\tau_3 = t_3 - t_1$. After the instant $t_3$ the sampling pulse, having a duration $t_r''$, is applied to the control terminals of the read amplifiers $V_1'$ and $V_{18}'$. When information is read from the storage elements Gb of the planes 1 to 18, the element Ga' of plane 19 is simultaneously read and the sense generator $AG_a'$ is started at the instant $t_2$. After the delay time $\tau_3$ the sense generator $AG_a'$ supplies the sampling pulse which starts at the instant $t_4$, being $t_2 + \tau_3$. This sensing instant coincides with the instant at which the delta-noise induced in the sense windings $p_a'$ of the planes 1 to 18 has decreased below the threshold value Dr. After the instant $t_4$ the sampling pulse, having a duration $tr''$, is applied to the control terminals of the read amplifiers $V_{1a}'$ to $V_{18a}'$. As is shown in FIG. 7, the portions of desired signals originating from storage elements in the planes 1 to 18, which are simultaneously selected with the storage elements Ga' and Gb' of plane 19 and which are situated within the sampling pulse, are equally large. As a result, the intensities of detected signals originating from storage elements containing the information 1 will be equally large for all storage elements, independent of the position in the surfaces, and they will be optimally sensed without noise.

What is claimed is:

1. A storage device for storage of word-organized information, comprising:

magnetic storage elements arranged in an identical manner in rows and columns within a plurality of planes;

a first drive winding for each row coupled to each of said storage elements;

a second drive winding for each column coupled to each of said storage elements;

an inhibit winding for each plane coupled to said windings;

a first sense winding for each plane;

said first sense winding coupled to respective storage elements situated in a first and a third quadrant of each plane;

a first read amplifier for each plane connected to respective first sense windings of each plane;

a second sense winding for each plane, said second sense winding coupled to respective storage elements situated in a second and a fourth quadrant of each plane;

a second read amplifier for each plane connected to respective second sense windings of each plane;

an addition plane of storage elements having a first and a second sense winding extending through the storage elements of the additional plane in an opposite fashion to those sense windings of the other planes;

a first sense generator connected to the first sense winding of the additional plane, said first sense generator having an output terminal respectively connected to control terminals of the first read amplifiers; and a second sense generator connected to the second sense winding of the additional plane, said second sense generator having an output terminal respectively connected to control terminals of the second read amplifiers.

* * * * *